United States Patent [19]

Barecki

[11] 4,113,270

[45] Sep. 12, 1978

[54] WHEELCHAIR RETAINER MECHANISM

[75] Inventor: Chester J. Barecki, Grand Rapids, Mich.

[73] Assignee: American Seating Company, Grand Rapids, Mich.

[21] Appl. No.: 774,528

[22] Filed: Mar. 4, 1977

[51] Int. Cl. ...................................... B60p 7/00

[52] U.S. Cl. .................................. 280/179 R; 188/2 F

[58] Field of Search .................... 280/179 R; 188/2 F; 248/119 R, 500, 503; 105/464, 367; 70/235; 292/48

[56] References Cited

U.S. PATENT DOCUMENTS

| | | | |
|---|---|---|---|
| 607,545 | 7/1898 | Martin | 70/235 |
| 4,019,752 | 4/1977 | Leon et al. | 280/179 R |
| 4,027,747 | 6/1977 | Moorman | 248/500 |

*Primary Examiner*—Robert R. Song

*Attorney, Agent, or Firm*—Price, Heneveld, Huizenga & Cooper

[57] ABSTRACT

A wheelchair retainer mechanism as disclosed including a housing having an outwardly opening mouth dimensioned to receive a wheelchair wheel. The mouth is formed by a pair of jaws, each pivotally mounted to the housing for movement from a first position permitting entrance of the rim of a wheelchair wheel into the housing to a second position closing off the mouth of the housing to thereby lock the wheelchair in place. A shiftable jaw closure is slidably supported on the housing and is engaged by an entering wheelchair wheel and pivots the jaws from the first position to the second, locked position. A plunger lock, mounted to the housing, automatically shifts to a position locking the jaws in their second, closed position.

18 Claims, 7 Drawing Figures

WHEELCHAIR RETAINER MECHANISM

BACKGROUND OF THE INVENTION

This invention relates to passenger restraint systems, and more particularly, to a wheelchair restraint for locking a wheelchair in place in a motor vehicle.

Typical passenger restraint systems employed with conventional transportation seating may be of either the active or passive type. Passive systems include air bags and compartmentalization approaches. Active restraint systems, however, usually take the form of lap and shoulder belts adapted to hold a passenger in place on the seat in a crash situation. Conventional seating, fixably attached to a vehicle and including such active restraint systems, are easily used by non-handicapped passengers. However, handicapped passengers who normally occupy wheelchairs are not able to use such systems without a great deal of effort or without assistance.

In vehicles which are designed to transport both wheelchair passengers and non-handicapped passengers, seats have been developed wherein the bench portion of the seat may be pivoted from a horizontal position to a vertical position. Some form of wheelchair restraint or retainer mechanism is then attached to the undersurface of the bench portion of the seat. The wheelchair restraint or retainer mechanism is designed to lock the wheel of the wheelchair in place. Once the wheelchair is locked in place, a shoulder and lap belt restraint system may be employed to provide crash protection to the wheelchair occupant. Such seating arrangements eliminate the need for lifting the passenger from the wheelchair and onto a conventional transverse seat by may also be used for transporting non-handicapped passengers in a conventional manner.

Heretofore, at least one form of wheelchair restraint mechanism attachable to the undersurface of a bench seat or attachable to any other point on the interior of the vehicle has been proposed. This wheelchair restraint mechanism employs a single generally U-shaped clamp pivotally mounted on a bracket securable to the interior of the vehicle. One wheel of a wheelchair is backed into the U-shaped clamp which pivots to a position generally transverse of the vehicle so that one leg of the clamp will restrain the wheel and position the wheelchair in place. A manually shiftable arrangement is provided for holding the U-shaped clamp in the restraining position and for releasing the clamp in order to release the wheelchair.

SUMMARY OF THE INVENTION

A need exists for a simple, easily operated wheelchair restraint of the aforementioned type which effectively locks a wheelchair in place with a minimum of effort, is easily used and which is easily released. Essentially, the wheelchair restraint in accordance with the present invention includes a housing having an outwardly opening mouth dimensioned to receive a wheelchair wheel. The mouth includes a pair of jaws each pivotally mounted to the housing for movement from a first position permitting entrance of the rim of a wheelchair wheel into the housing to a secured position closing the mouth of the housing to thereby retain the wheel. Means mounted on the housing and engaged by an entering wheelchair wheel are provided for pivoting the jaws from the first position to the second position. Provision is made for automatically locking the jaws in the second position after entrance of the wheelchair wheel rim and for releasing jaws to unlock the wheelchair.

DETAILED DESCRIPTION OF THE PREFERRED EMBODIMENT

Figure 1:
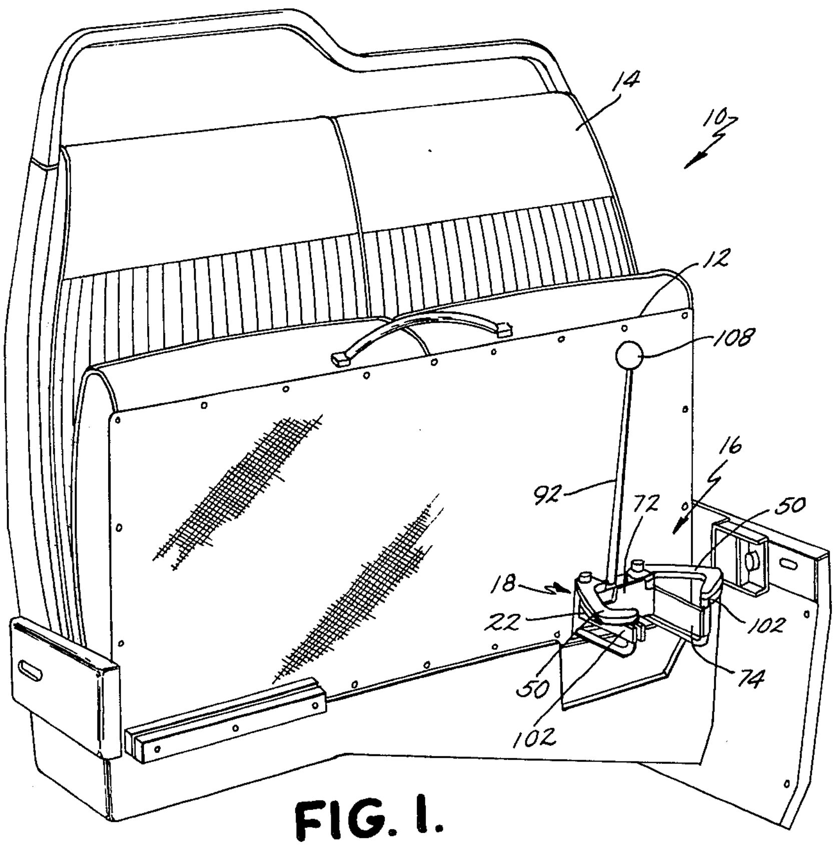
FIG. 1 is a perspective view showing a conventional, cantilevered seat with a wheelchair restraint in accordance with the present invention mounted thereon.

A cantilevered-type wheelchair seat is illustrated in FIG. 1 and generally designated 10. The seat 10 is of a jump seat type and includes a transverse bottom or bench portion 12 and an upright back portion 14. The transverse seat or bench portion 12 is foldable from a horizontal position usable as a regular transportation seat to a vertical position illustrated in FIG. 1 for use as a wheelchair seat. Secured to the bottom of the seat 12 is a wheelchair retainer or restraint 16. The retainer or restraint 16 is adapted to lock the wheelchair in place so that the occupant may be restrained by a lap and shoulder belt arrangement without having the wheelchair shift with respect to the seat structure.

Figure 4:
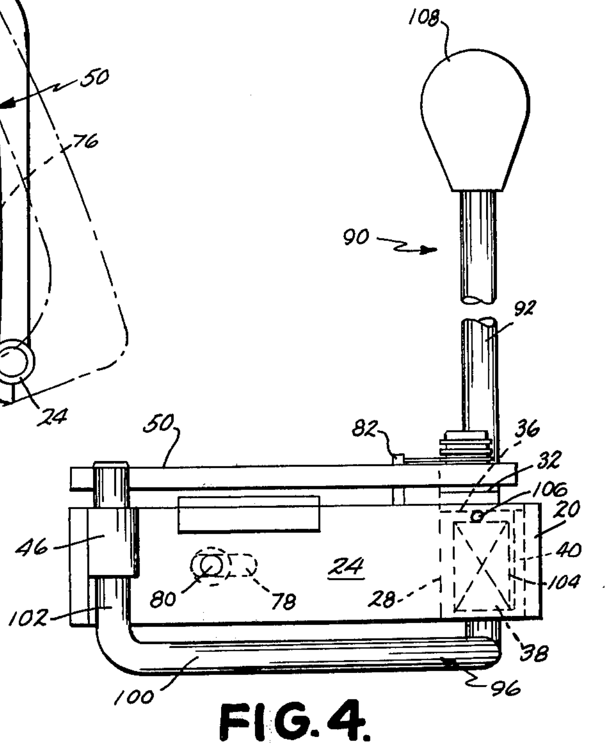
FIG. 4 is a fragmentary, side elevational view of the wheelchair restraint.
Figure 5:
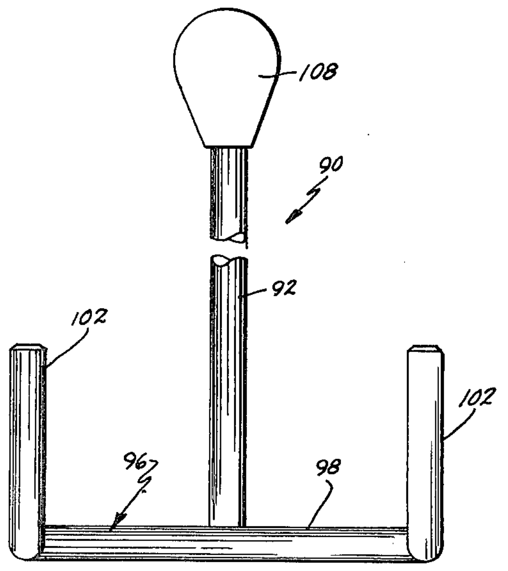
FIG. 5 is a fragmentary, front elevational view of a component of the plunger assembly incorporated in the wheelchair retainer of the present invention.
Figure 6:
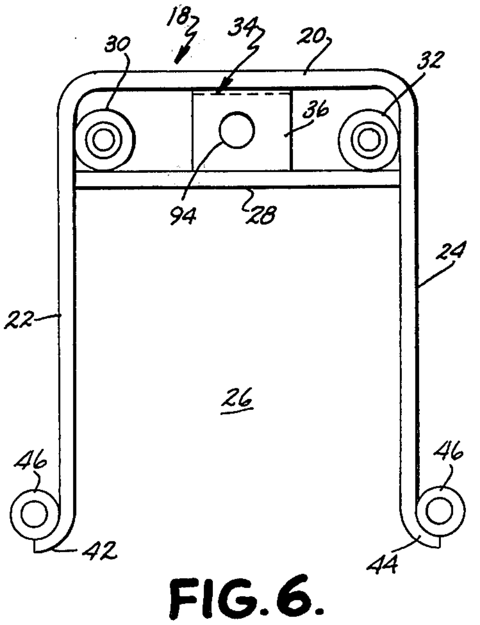
FIG. 6 is a top, plan view of the wheelchair retainer housing.
Figure 7:
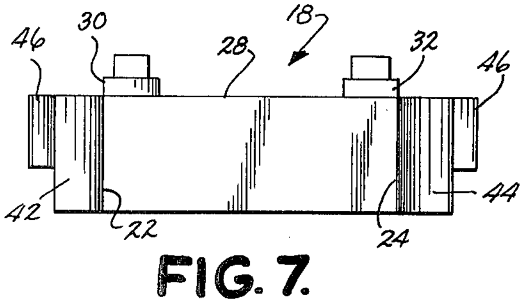
FIG. 7 is a front, elevational view of the wheelchair retainer housing.

The wheelchair restraint or retainer 16 in accordance with the present invention includes a housing 18 best seen in FIGS. 6 and 7. The housing 18 in the embodiment illustrated has a generally U-shape in plan including a rear wall 20 interconnecting spaced, parallel side walls 22, 24. The housing 18, therefore, defines an outwardly opening mouth 26 which is dimensioned to receive a wheelchair wheel. An intermediate wall or reinforcement plate 28 extends between the legs 22, 24 of the housing 18. The intermediate wall 28 is spaced from the rear wall 20 and extends generally parallel thereto. Weldably or otherwise suitably secured to the inner surface of the intermediate wall 28 and the side walls 22, 24 and between the intermediate wall 28 and the rear wall 20 are a pair of generally cylindrical retainers 30, 32, (FIGS. 6 and 7). A spring housing or plunger release retainer bracket 34, as more fully described below, is also positioned between the rear wall 20 and the intermediate wall 28 intermediate the ends thereof. The housing 34 includes an upper web 36 and a lower web 38. The upper web 36 and the lower web 38 are joined by a vertical portion 40 (FIG. 4). The vertical portion 40 is welded or otherwise suitably secured to the rear wall 20 and the webs 36, 38 are welded or otherwise suitably secured to the intermediate wall 28.

The free ends of the legs 22, 24 are flared outwardly to define lip portions 42, 44, respectively. Secured to the lip portions 42, 44 on the outer surfaces of the legs 22, 24 are cylindrical guides or bushings 46, for reasons more fully explained below.

Figure 2:
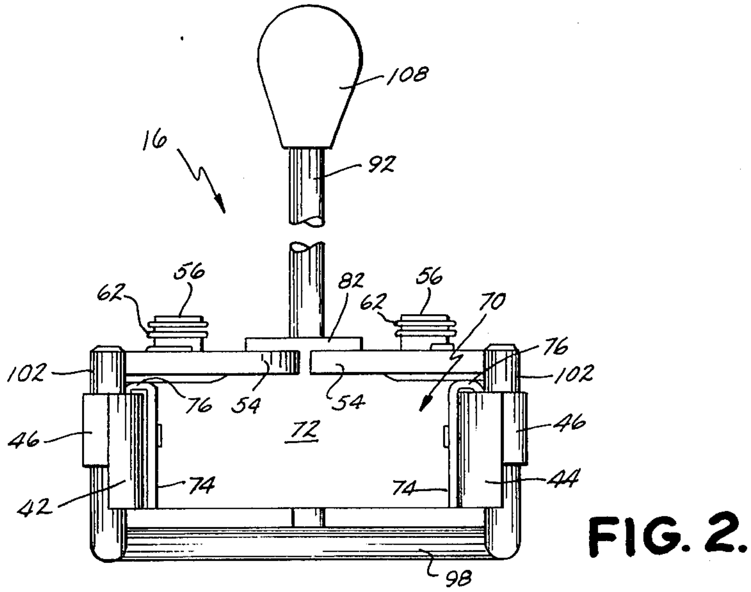
FIG. 2 is a fragmentary, front elevational view of a wheelchair restraint in accordance with the present invention.
Figure 3:
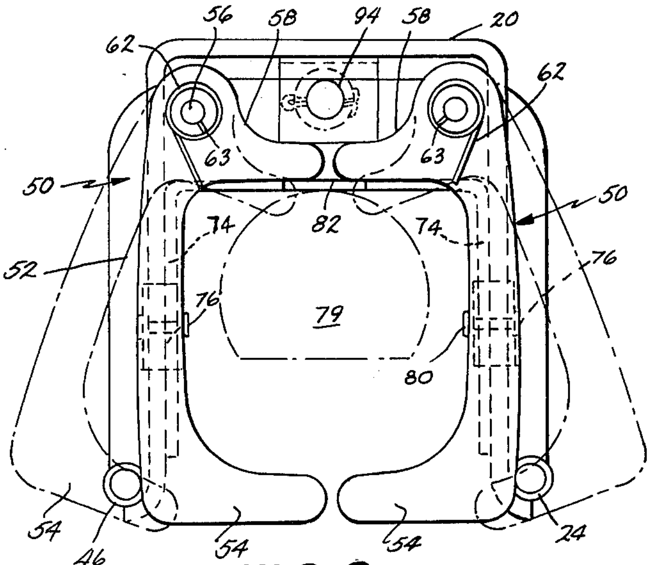
FIG. 3 is a top, plan view of the wheelchair restraint.

As best seen in FIGS. 2, 3 and 4, a pair of opposed jaws 50 are pivotally mounted to the housing 18 at the retainers 30, 32. The jaws 50 which form the clamping mechanism have a generally L-shape in plan and each includes an elongated leg 52 and a free leg 54. The end of the leg 52 opposite the free leg 54 is pivotally mounted to the housing 18 by suitable means such as a bolt 56 which extends downwardly through the top of the leg 52 and into a respective retainer 30, 32. As a result, each jaw 50 is pivotally mounted for movement from a first position shown in FIG. 1 and shown in phantom in FIG. 3 wherein the mouth of the housing is open to permit entrance of a wheelchair wheel to a second position shown in solid lines in FIG. 3 and FIG. 2 wherein the mouth of the housing is closed off and the free legs 54 of each jaw are immediately opposed.

Each jaw 50 further includes a shift tab or lever arm 58 integral with the leg 52 adjacent the pivot point thereof. The shift tabs 58 extend generally perpendicular to the leg 52 and generally parallel to the free leg 54. As more fully explained below, the shift tabs or lever arms 58 are provided to automatically pivot the jaws 50 to their second, closed position upon entrance of a wheelchair wheel.

Biasing means preferably in the form of a coil spring 62 bias each jaw outwardly to their open or first position. Each coil spring 62 is positioned on a bolt 56. One end 63 of the coil spring is staked to the bolt and the other end 64 engages the knee defined by the shift tab 58 and the leg 52 of the jaw. Inward movement of the jaw coils the spring which biases the jaw outwardly. The jaws when in their first or open position permit unobstructed access into the housing mouth. A wheelchair wheel is easily backed into the mechanism without interference with the clamping mechanism.

Means are provided for engaging the shift tabs 58 and automatically pivoting the jaws 50 to their closed position upon entrance of the wheelchair wheel. In the preferred embodiment, the jaw pivoting or shiftable jaw closure and lock assist means takes the form of a generally U-shaped member 70 dimensioned to fit within the housing 18. The member 70 includes a base wall 72 and side walls 74. The side walls extend outwardly from each end of the base wall 72 and are generally parallel to each other. Integral with the top lateral edge of each leg 74 is a generally channel-shaped tab or guide 76. The channel-shaped tab 76 is dimensioned to fit over and ride on the top lateral edge of the legs 22, 24 of the housing 18. As seen in FIGS. 2, 3 and 4. each leg 74 of the pivoting means is provided with a longitudinal slot 78. A rivet or slide pin extends inwardly from each leg 22, 24 of the housing through the slot 78. As a result, the member 70 is mounted for reciprocating or sliding motion relative to the housing 18. The rear wall 72 of the member 70 includes an upwardly extending tab-like portion 82 which is dimensioned to engage the ends of the shift tabs 58 of each jaw 50. The slots 78 are dimensioned so that the lock assist 70 also serves as a stop limiting outward pivotal movement of the jaws, as seen in FIG. 1.

As should now be readily apparent, when a wheelchair wheel 79 (FIG. 3) is moved inwardly into the mouth 26 of the housing 18 it will engage the rear wall 72 of the means 70. The tab 82 engages the shift tabs or lever arms 58 of each jaw 50. Continued rearward movement of the wheel as shown in FIG. 3 will shift the member 70 rearwardly thereby pivoting the jaws 50 towards each other to their second or wheelchair lock position. The two jaw feature of the present invention prevents damage to the wheelchair wheel and the wheel spokes. The jaws encircle the tire and rim and extend between the spokes to thereby effectively lock the wheel in place.

A plunger subassembly 90 is shiftably mounted on the housing 18 so as to lock the jaws 50 in the second position as well as to release the jaws to permit them to pivot outwardly under the bias of the springs 62 to their open position. The plunger subassembly 90 includes an elongated plunger rod 92 having a knob 108 and which extends through co-axial apertures 94 formed in the upper and lower webs 36, 38 (FIG. 4) of the housing. Secured or formed integral with the lower end of the plunger rod 92 is a generally U-shaped lock pin carrier 96. The lock pin carrier 96 includes a base portion 98 and side legs 100. The plunger rod 92 is weldably secured to the base portion 98. Formed integral with or joined to the free ends of the side legs 100 are upwardly directed or vertically positioned lock pins 102. The lock pin carrier 96 is dimensioned so that the lock pins 102 extend upwardly within the guides 46 secured to the side walls 22, 24 of the housing. Positioned around the rod 92 and within the housing 34 defined by the webs 36, 38 is a biasing means 104 in the form of a coil spring (FIG. 4). The coil spring 104 abuts the upper surface of the lower web 38 and engages a pin 106 which extends through the rod 92 within the confines of the spring housing or bracket 34. The spring or biasing means 104 biases the plunger subassembly 92 upwardly relative to the housing 18 towards their locking position. As best seen in FIGS. 2 and 3, when the jaws 50 have been pivoted towards each other to their second locking position, the plunger under the action of spring 104 shifts upwardly. The locking pins 102 therefore move upwardly in their guides 46 and engage the outer lateral edges of the jaws 50. As a result, the jaws will automatically be prevented from pivoting outwardly under the bias of the springs 62 to their first or open position. In order to release the jaws, the wheelchair occupant need only grasp the knob 108 and push it downwardly against the bias of the spring 104. This causes the free ends of the locking pins 102 to move downwardly and disengage from the lateral edges of the jaws 50 permitting the jaws 50 under the bias of the springs 62 to pivot outwardly above the locking pins 102 as shown in phantom in FIG. 3. This outward pivotal movement of the jaws 50 also slides the locking assist or closure member 70 outwardly towards the mouth of the housing.

When it is desired to lock a wheelchair in place relative to a seat or other part of the vehicle, the plunger is pushed downwardly releasing the jaws, which pivot outwardly sufficiently so that the opening to the housing is not blocked by any part of the mechanism. The wheel rim of the wheelchair is then backed up into the wide mouth 26 of the housing causing the wheel rim to engage the rear wall 72 of the closure member 70. The rear wall tab 82 then engages the shift lugs 58 of each jaw and pivot the jaws inwardly to their second lock position. The plunger subassembly automatically shifts under the bias of spring 104, shifting the lock pins 102 so that they prevent outward pivotal movement of the jaws 50. In this manner, the wheelchair is positively locked in position and will not shift relative to the vehicle structure to which the housing 18 is attached. The occupant may then fasten the conventional lap and shoulder belts of the passenger restraint system. As best seen in FIG. 3, when the rod 92 is pushed downwardly and the jaws pivot outwardly, the forward shifting of the member 70 is limited so that the ends of the legs 54 of each jaw are positioned above the lock pins 102.

The unique wheelchair restraint or retainer mechanism in accordance with the present invention is relatively easily manufactured from a high strength material. It is preferred that the material selected be such that the unit be capable of withstanding a forward load of at least 3000 lbs.

In a presently existing embodiment of the wheelchair retainer in accordance with the present invention, the jaws, the housing and the lock assist member are all fabricated from cold rolled steel. The plunger release retainer bracket or housing 34 is fabricated from 16 gauge cold rolled steel. The intermediate wall or reinforcement plate 28 is fabricated from 7 gauge cold rolled steel as are the housing and jaw lock assist bracket 70. The plunger assist spring 106 may be fabricated from 17 gauge music wire and the jaw pivot springs 62 may be fabricated from 18 gauge music wire. The slide pins 80 may simply take the form of solid rivets. The unit is preferably dimensioned to accept wheelchairs of different size wheels. Wheelchairs, typically, may be equipped with slim, medium and balloon size tires. The unit, to be versatile, should accept all sizes.

In view of the foregoing description, it can now be seen that the present invention provides a simple, easily manufactured retainer which effectively locks a wheelchair in position, is capable of automatic operation and which is readily released to unlock the wheelchair from the vehicle structure. Various modifications will undoubtedly now become apparent to those of ordinary skill in the art which would not depart from the inventive concepts disclosed herein. For example, the shape of the housing, the plunger subassembly and the jaws may be varied without affecting their operability. Therefore, it is expressly intended that the above description should be considered as that of the preferred embodiment. The true spirit and scope of the present invention may be determined by reference to the appended claims.

The embodiments of the invention in which an exclusive property or privilege is claimed are defined as follows.

1. A wheelchair retainer attachable to the interior of a vehicle for retaining a wheelchair in a fixed position during vehicle movement, comprising:

a housing attachable to the interior of the vehicle and having an outwardly opening mouth dimensioned to receive a wheelchair wheel;

a pair of jaws, each pivotally mounted to said housing for movement from a first position permitting entrance of a wheelchair wheel into said housing to a second position closing the mouth of the housing and thereby retaining said wheel;

means slidably mounted on said housing independent of said jaws and engaged by an entering wheelchair wheel for engaging and pivoting said jaws from said first position to said second position; and lock means mounted to said housing for locking said jaws in said second position after entrance of said wheelchair wheel.

2. A wheelchair retainer as defined by claim 1 wherein each of said jaws includes a generally L-shaped portion having a first leg and a second leg, said first leg being pivoted to said housing.

3. A wheelchair retainer as defined by claim 2 further including biasing means for each jaw operatively engaging said first leg of said jaw for biasing said jaw to said first position.

4. A wheelchair retainer attachable to the interior of a vehicle for retaining a wheelchair in a fixed position during vehicle movement, comprising:

a housing attachable to the interior of the vehicle and having an outwardly opening mouth dimensioned to receive a wheelchair wheel;

a pair of jaws, each pivotally mounted to said housing for movement from a first position permitting entrance of a wheelchair wheel into said housing to a second position closing the mouth of the housing and thereby retaining said wheel;

means movably mounted on said housing and engaged by an entering wheelchair wheel for engaging and pivoting said jaws from said first position to said second position; and lock means mounted to said housing for locking said jaws in said second position after entrance of said wheelchair wheel, each of said jaws including a generally L-shaped portion having a first leg and a second leg, said first leg being pivoted to said housing, said means for pivoting said jaws including a generally U-shaped member having a base portion and side portions, and means for slidably mounting said side portions to said housing for movement towards and away from said housing mouth, said base portions being engaged by an entering wheelchair wheel and said U-shaped member engaging said jaws.

5. A wheelchair retainer as defined by claim 4 wherein each of said jaws includes a shift tab integral with said first leg and extending into said housing when said jaw is in said first position; said base portion of said U-shaped member engaging each of said shift tabs.

6. A wheelchair retainer attachable to the interior of a vehicle for retaining a wheelchair in a fixed position during vehicle movement, comprising:

a housing attachable to the interior of the vehicle and having an outwardly opening mouth dimensioned to receive a wheelchair wheel;

a pair of jaws, each pivotally mounted to said housing for movement from a first position permitting entrance of a wheelchair wheel into said housing to a second position closing the mouth of the housing and thereby retaining said wheel;

means movably mounted on said housing and engaged by an entering wheelchair wheel for engaging and pivoting said jaws from said first position to said second position; and lock means mounted to said housing for locking said jaws in said second position after entrance of said wheelchair wheel, said lock means comprising first and second lock pins movably mounted to said housing and shiftable from a first, non-lock position to a second lock position wherein each lock pin engages one of said jaws and prevents shifting of said jaws from said second position to said first position; and means on said housing for shiftably mounting said lock pins to said housing.

7. A wheelchair retainer as defined by claim 6 wherein said housing comprises:

a generally U-shaped housing member having spaced, parallel side walls interconnected by a rear base wall; and wherein said shiftably mounting means comprises a guide at the free end of each of said side walls, said first and second lock pins slidably disposed in a respective one of said guides.

8. A wheelchair retainer as defined by claim 7 wherein said housing further includes an intermediate wall spaced from and parallel to said rear wall and upper and lower webs extending between said rear wall and said intermediate wall.

9. A wheelchair retainer as defined by claim 8 wherein said lock means further includes:

a U-shaped portion having a base disposed under said upper and lower webs and a pair of spaced, parallel leg portions, said first lock pin integral with the end of one of said leg portions and said second lock pin integral with the other of said leg portions; and an elongated plunger extending through said upper and lower webs and being joined to the base of said U-shaped portion of said lock means.

10. A wheelchair retainer as defined by claim 9 further including plunger biasing means disposed between said upper and lower webs for biasing said plunger to a position wherein said lock pins are in said second lock position, said lock pins shiftable to said first non-lock position by manual shifting of said plunger.

11. A wheelchair restraint for locking a wheelchair in place in a vehicle as part of a passenger restraint system, said wheelchair restraint comprising:

a bracket including a rear wall attachable to a fold-up seat bottom and said bracket further includes a pair of side walls;

jaw means pivotally mounted on said bracket for retaining a wheelchair wheel between said side walls;

jaw closing means carried by said bracket independent of said jaw means and engaged by an entering wheelchair wheel for pivoting said jaw means from an open position to a closed position retaining said wheelchair wheel within said housing and for limiting outward pivotal movement of said jaw means; and automatic lock means carried by said bracket for locking said jaws automatically when said jaws are pivoted to said closed position.

12. A wheelchair restraint as defined by claim 11 wherein said jaw means comprises:

a pair of L-shaped jaws each having a leg pivoted to said bracket adjacent said rear wall, the free legs of said jaws being opposed when said jaws are in the closed position.

13. A wheelchair restraint for locking a wheelchair in place in a vehicle as part of a passenger restraint system said wheelchair restraint comprising:

a bracket including a rear wall attachable to a fold-up seat bottom and said bracket further includes a pair of sidewalls;

jaw means pivotally mounted on said bracket for retaining a wheelchair wheel between said side walls;

jaw closing means carried by said bracket and engaged by an entering wheel chair wheel for pivoting said jaw means from an open position to a closed position retaining said wheelchair wheel within said housing; and automatic lock means carried by said bracket for locking said jaws automatically when said jaws are pivoted to said closed position, said jaw means comprising:

a pair of L-shaped jaws each having a leg pivoted to said bracket adjacent said rear wall, the free legs of said jaws being opposed when said jaws are in the closed position, said automatic lock means comprising:

a member mounted on said bracket for vertical movement relative to said bracket and having a pair of spaced, upstanding pins positioned adjacent the outer surfaces of said side walls of said bracket, said member being movable to a lock position wherein said pins lock said jaws in said closed position.

14. A wheelchair restraint as defined by claim 13 wherein said automatic lock means further includes biasing means engaging said member for biasing said member to said lock position.

15. A wheelchair restraint as defined by claim 14 wherein said pins contact the undersurface of said jaws when said jaws are in their open position and said pins move upwardly under the bias of said biasing means to block opening movement of said jaws when said jaws move to their closed position.

16. A wheelchair restraint as defined by claim 12 wherein said jaw means further includes each of said jaws having an inwardly directed lever arm substantially perpendicular to said pivoted leg, said lever arms extending towards each other when said jaws are in the closed position.

17. A wheelchair restraint for locking a wheelchair in place in a vehicle as part of a passenger restraint system, said wheelchair restraint comprising:

a bracket including a rear wall attachable to a fold-up seat bottom and said bracket further includes a pair of side walls;

jaw means pivotally mounted on said bracket for retaining a wheelchair wheel between said side walls;

jaw closing means carried by said bracket and engaged by an entering wheelchair wheel for pivoting said jaw means from an open position to a closed position retaining said wheelchair wheel within said housing; and automatic lock means carried by said bracket for locking said jaws automatically when said jaws are pivoted to said closed position, said jaw means comprising:

a pair of L-shaped jaws each having a leg pivoted to said bracket adjacent said rear wall, the free legs of said jaws being opposed when said jaws are in the closed position, said jaw means further including each of said jaws having an inwardly directed lever arm substantially perpendicular to said pivoted leg, said lever arms extending towards each other when said jaws are in the closed position, said jaw closing means further including:

a member having a wheel engaged wall and spaced side portions;

mounting means operatively engaging said side portions for mounting said member for limited movement towards and away from said bracket rear wall within said bracket, said wheel engaged wall contacted by said lever arms when said jaws are in their open position, said member being shifted by an entering wheel to thereby pivot said lever arms and said jaws to their closed position.

18. A wheelchair restraint as defined by claim 14 further including spring means at each of said jaws, said spring means engaging said jaw and biasing said jaw to an open position, said jaws automatically opening under the bias of said spring means upon manual shifting of said lock means downwardly against the bias of said lock means biasing means.

* * * * *

UNITED STATES PATENT AND TRADEMARK OFFICE

CERTIFICATE OF CORRECTION

PATENT NO. : 4,113,270

DATED : September 12, 1978

INVENTOR(S) : Chester J. Barecki

It is certified that error appears in the above-identified patent and that said Letters Patent are hereby corrected as shown below:

Column 1, line 35:

"by" should be --but--;

Column 4, line 48:

"locking" should be --lock--;

Column 6, line 30:

"portions" should be --portion--.

Signed and Sealed this

*Eighth* Day of *May 1979*

[SEAL]

*Attest:*

RUTH C. MASON
*Attesting Officer*

DONALD W. BANNER
*Commissioner of Patents and Trademarks*